United States Patent [19]

Kimura et al.

[11] Patent Number: 4,484,378
[45] Date of Patent: Nov. 27, 1984

[54] BINDER FOR BINDING A BUNDLE OF ELONGATED BODIES

[75] Inventors: Shigeru Kimura, Kamakura; Masaru Arakawa, Chigasaki, both of Japan

[73] Assignee: NIFCO Inc., Yokohama, Japan

[21] Appl. No.: 476,189

[22] Filed: Mar. 17, 1983

[30] Foreign Application Priority Data

Mar. 19, 1982 [JP] Japan .................................. 57-42830

[51] Int. Cl.³ .......................... B65D 63/00; F16L 3/00
[52] U.S. Cl. ................................ 24/30.5 S; 24/16 PB; 24/30.5 T; 24/571; 248/74.3; 248/74.5
[58] Field of Search ................ 24/16 R, 16 PB, 17 R, 24/17 AP, 17 B, 17 A, 30.5 R, 30.5 T, 30.5 P, 543, 545, 546, 571, DIG. 29; 248/68.1, 74.5, 74.3

[56] References Cited

U.S. PATENT DOCUMENTS

| 517,970 | 4/1894 | Alexander | 24/545 |
| 1,006,241 | 10/1911 | Lippert | 24/30.5 R |
| 1,338,612 | 4/1920 | Buschardt | 24/546 |
| 2,685,679 | 8/1954 | Sam | 24/545 |
| 2,981,990 | 5/1961 | Balderree, Jr. | 24/30.5 S |
| 3,044,230 | 7/1962 | Fisher | 24/16 R |
| 3,170,213 | 2/1965 | Thomas, Jr. | 24/30.5 S |
| 3,421,187 | 1/1969 | Ryder | 248/74.5 |
| 3,500,505 | 3/1970 | Thompson | 24/16 PB |
| 3,543,353 | 12/1970 | Meehan | 24/16 PB |
| 3,864,790 | 2/1975 | Reinwall, Jr. | 24/30.5 R |
| 3,882,573 | 5/1975 | Thomas, Jr. | 24/30.5 T |
| 3,938,656 | 2/1976 | Owen | 24/16 PB |
| 4,024,604 | 5/1977 | Klimek et al. | 24/16 R |

FOREIGN PATENT DOCUMENTS

| 2293650 | 7/1976 | France | 248/74.5 |
| 621438 | 6/1961 | Italy | 24/16 PB |

Primary Examiner—Victor N. Sakran
Attorney, Agent, or Firm—T. W. Buckman; J. R. Halvorsen

[57] ABSTRACT

Disclosed is a binder for binding a bundle of elongated bodies comprising a closed loop and a pair of converging-and-diverging arms integrally connected to the opposite middle portions of the loop and rising therefrom. In use a bundle of elongated bodies are pushed in between the opposite arms, and then the bundle is bound by intertwisting the arms around the bundle. A binder according to this invention assures a tight binding irrespective of the size of the bundle.

11 Claims, 14 Drawing Figures

BINDER FOR BINDING A BUNDLE OF ELONGATED BODIES

BACKGROUND OF THE INVENTION

This invention relates to an improvement in or relating to a plastic device for bundling and binding wires, rods, electric conductors and other linear or elongated bodies.

A variety of binders for binding linear bodies into a bundle have been hitherto proposed. Among them a binder, commonly called "Pass-Lock", is simple in structure, and is easy to handle, still assuring a reliable binding. Specifically, a "Pass-Lock" comprises an open loop and two arms integrally connected to and extending from the open ends of the open loop in a divergent form, each arm being equipped with a spherical hook at its free end. (U.S. Pat. No. 3,543,353).

In use, a bundle of elongated bodies are pushed into the open loop, and then the two divergent arms are crossed and intertwisted with each other. The force of restitution which is generated in each of the deformed arms is effective to positively hold the two arms in an intertwisted condition, thereby assuring a reliable binding of the elongated bodies therearound.

With this arrangement, however, only a bundle of elongated bodies as large in section as the circular space of the open loop can be tightly bound. Stated otherwise, a bundle of elongated bodies which is smaller is section than the open loop will be loosely bound, whereas a larger bundle cannot be bound therearound. The binder is usually made of a flexible material, and therefore it can grip a bundle of elongated bodies even if its sectional area is somewhat larger or smaller than the open loop of the binder. The allowance for its gripping size, however, is relatively small. Therefore, it is necessary to prepare binders of as many different sizes as different kinds and sizes of elongated bodies to be bound. This leads to designing and producing molds of different sizes, and eventually to increasing manufacturing costs because of the relatively complexity in the shape of the molds from which binders of different sizes are patterned. Still disadvantageously, it is most likely that a bundle of elongated bodies bound therearound with such binder are put into disorder, inclined in all directions ahead and behind the binder on the bundle. In order to put a bundle of elongated bodies in good order they must be bound at spaced locations along their full length, thus eventually requiring an increased number of binders and accordingly much labor in binding those elongated bodies.

SUMMARY OF THE INVENTION

The object of this invention is to provide an improved binder which can grip any bundle of elongated bodies over a relatively wide range of cross-sections, still assuring a tight and stable binding of the elongated bodies.

To attain this object a binder according to this invention comprises a closed loop and a pair of bent arms integrally connected to and rising from two opposite middle portions of the closed loop, said bent arms first converging toward each other and then diverging apart from each other, and ending with spherical hooks.

In binding a bundle of elongated bodies, the bundle is pushed in a triangular space which is defined by the closed loop and the rising and converging parts of the arms, and then the diverging parts of the arms are intertwisted with each other, thus holding the elongated bodies positively with the force of restitutions generated both in the twisted arms and the somewhat deformed loop.

A plurality of binders according to this invention can be connected to each other with the aid of joints, which are integrally connected to the loops of the binders. The binders thus connected are used to hold a plurality of bundles in parallel relationship. Also, a binder may be equipped with a fastening or anchoring means, which enables the binder to hold a bundle of elongated bodies along a panel material.

Other objects and features of this invention will be understood from the following description pertaining to preferred embodiments according to this invention, which are shown in accompanying drawings.

DESCRIPTION OF PREFERRED EMBODIMENTS

Figure 1A:
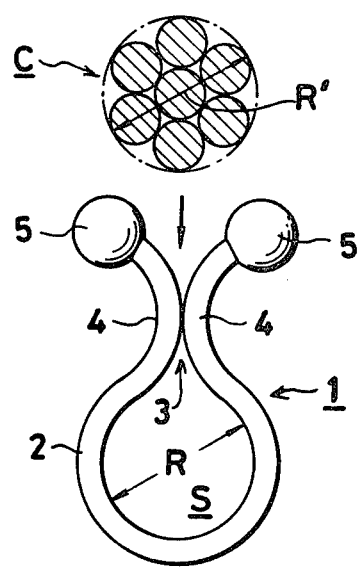
FIGS. 1(A) and 1(B) show a conventional plastic binder prior to and after binding, respectively.
Figure 1B:
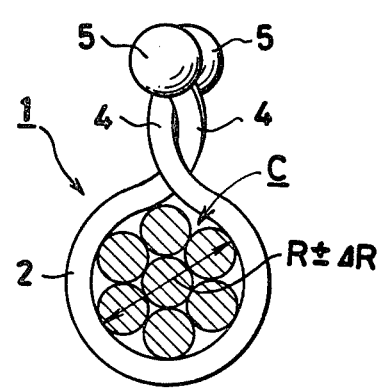
Figure 2:
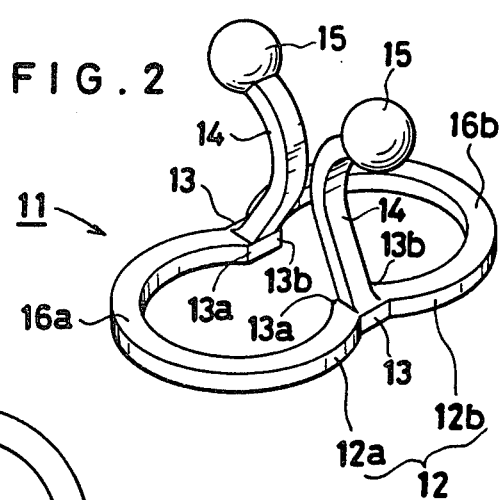
FIG. 2 is a perspective view of a binder according to a first embodiment of this invention.
Figure 3:
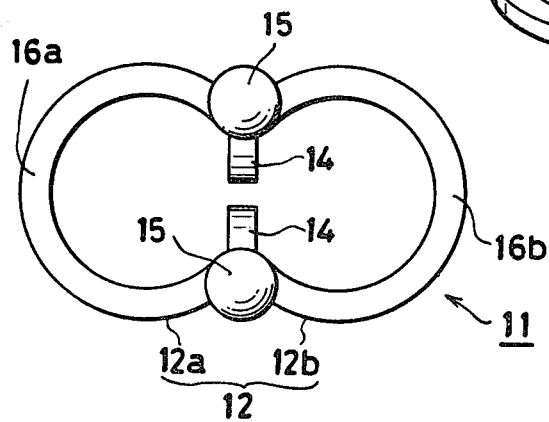
FIG. 3 is a plan view of the binder according to the first embodiment.
Figure 4:
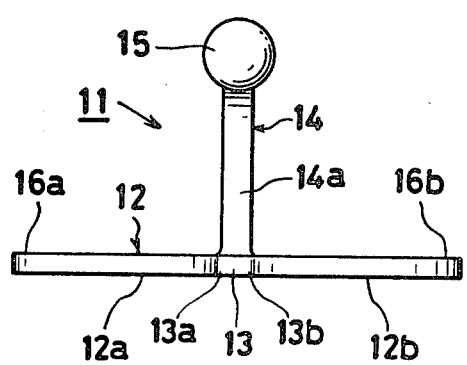
FIG. 4 is a side view of the binder according to the first embodiment.

FIGS. 1(A) and 1(B) show a conventional plastic binder, which is called a "Pass Lock". As shown, the binder is molded of plastic, and comprises an open loop 2, and two opposite bent arms 4 integrally connected to the opposite open ends of the open circular loop 2. These arms converge close in contact with each other and then diverge away from each other, each ending with a spherical hook 5. A bundle of elongated bodies "C" is pushed in between the opposite divergent arms 4, and then the arms 4 yieldingly open wide enough to allow the bundle to slip in the circular space "S" of the open loop 2.

After the bundle has passed through the inlet of the binder, the opposite arms return to their original, stress-free shape with the force of restitution, which is generated and stored in the arms when they are yieldingly separated, allowing the passage of the bundle therebetween. Thus, once the bundle "C" has been put in the circular space "S" of the loop, the entrance is automatically closed, thereby preventing the bundle from coming out of the loop space, and attaining temporary holding of the bundle.

As shown in FIG. 1(B), the opposite arms 4 are intertwisted with each other. Then, the arms 4 are held intertwisted with the force of restitution, which is generated and stored in the deformed arms 4, thus keeping the bundle of elongated bodies bound in a somewhat tight condition.

Such binder, however, can make only a small binding allowance $\pm \Delta R$ ($-\Delta R$ in almost all cases) for the diameter R of the circular space of the binder loop when binding a bundle of elongated bodies. Such poor flexibility, in fact, requires the preparation of binders of somewhat different sizes for different sizes of bundles. Obviously this is disadvantageous eventually increasing the number of the molds of somewhat different sizes, and accordingly requiring much labour in production and maintainance.

Within the small allowance $\Delta R$ the clamping or binding force varies greatly, and in particular at the lower limit of the allowance, that is, in binding as small a bundle as $R - \Delta R$ in diameter, the binder is easy to displace along the length of the elongated bodies. Otherwise, the binder is liable to incline with respect to the longitudinal direction of the bundle.

The object of this invention is to provide an improved plastic binder which is capable of clamping and binding a bundle of elongated bodies tightly even if the bundle size is different from the standard one, assuring a stable binding posture in situ all the time.

FIGS. 2-5 show a plastic binder 11 according to a first embodiment of this invention as seen from different angles of view.

Two semicircles 12a and 12b are integrally connected to each other with their open ends 13a and 13b abutting on each other, thus forming a closed loop 12 in the shape of a cocoon. A pair of arms 14 are integrally connected to the abutting ends of the open circles, that is, the middle reentrant portions 13 of the closed cocoon loop 12, and these arms 14 rise from the middle reentrant portions 13, first converging close to each other and then diverging away from each other in a vertical plane perpendicular to a horizontal plane in which the closed loop is laid. A spherical hook 15 is integrally connected to the free end of each arm.

FIGS. 5-9 show, in sequence, the manner in which the binder 11 is used to bind a bundle of elongated bodies.

Figure 5:
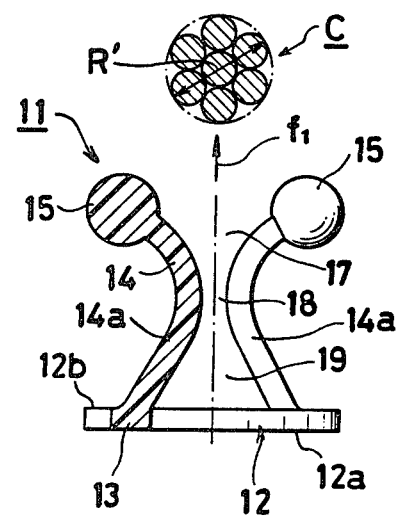
FIG. 5 is a front view, partly in section, of the binder.
Figure 6:
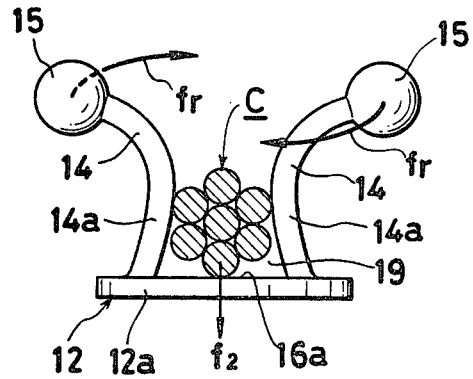
FIG. 6 is a front view of the binder at the first step of binding.

First, as shown in FIG. 5, a bundle of elongated bodies "C" is pushed in between the opposite arms 14 as indicated by arrow "$f_1$". Then, the arms 14 are separated away from each other, thereby allowing the bundle of elongated bodies to enter the space 19 defined by the closed loop and the rising arms, as shown in FIG. 6. The bottom of the bundle is laid on the closed loop and is supported by longitudinal-opposite portions 16a and 16b of the closed loop.

The opposite-bent arms 14 tend to return to their original condition, with a force of restitution which is applied to the upper opposite portions of the bundle at 14a, thus pushing the bundle down against the longitudinal opposite portions 16a and 16b of the closed loop, and attaining a temporary hold of the bundle in the binder. In case of binding a long bundle, first, a plurality of binders are fixed at regular intervals along the bundle, and then their arms are intertwisted one after another in such a way as mentioned hereinafter.

After pushing the bundle in between the opposite arms 14, these arms are intertwisted with the fingers put by their spherical hooks 15 as indicated by arrows "$f_r$" in FIG. 6.

Then, the arms 14 are yieldingly bent at 14a to fit themselves around the bundle, pushing the bundle down as indicated by arrow "$f_2$" in FIG. 6.

As a result the closed loop 12 is deformed causing the reentrant portions 13 of the loop to rise and the longitudinally opposite portions 16a and 16b to descend.

Figure 7:
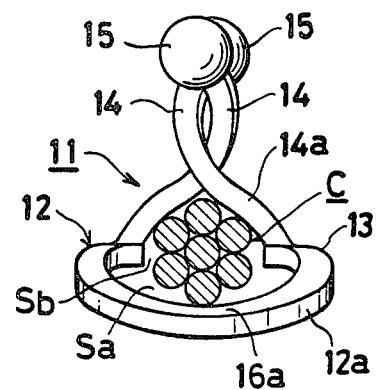
FIG. 7 is a front view of the binder at the final stage of binding.
Figure 8:
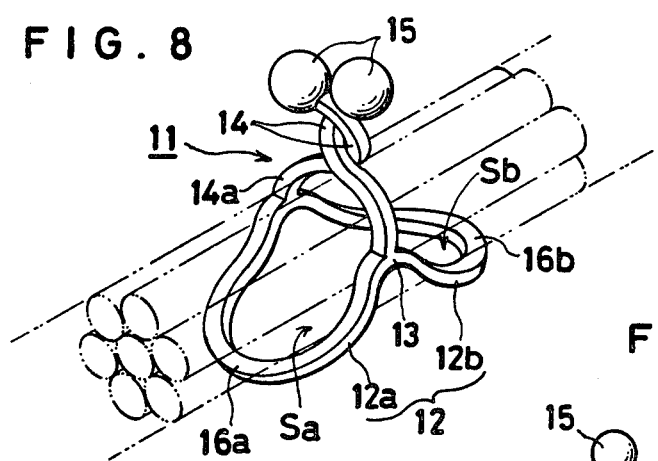
FIG. 8 is a perspective view of the binder at the final stage.

FIGS. 7 and 8 show the manner in which the binder 11 binds the bundle of elongated bodies at the final stage. The force of restitution which is generated and stored in the deformed arms are effectively used to keep the arms intertwisted, and therefore there would be no fear for eventual unbinding if the binder had no spherical hooks.

As is best understood from FIG. 8, a bundle of elongated bodies are supported at three different points, specifically at the longitudinally opposite points 16a and 16b of the closed loop and at the point at which the arms are intertwisted, and therefore the binding posture of the binder is stable with respect to the bundle of elongated bodies. The binder grips the bundle with an increased force of restitution, which is generated and stored in a greatly deformed closed loop, thus assuring a tight and reliable binding.

A bundle of elongated bodies "C" pass through the spaces "Sa" and "Sb" defined by the deformed circular portions of the closed loop. Thanks to the cocoon shape of the closed loop, no substantial reduction is caused across the middle reentrant portions 13 in spite of a great deformation of the closed loop, thus causing no adverse effect on its adaptability to binding bundles of different sizes.

Figure 9:
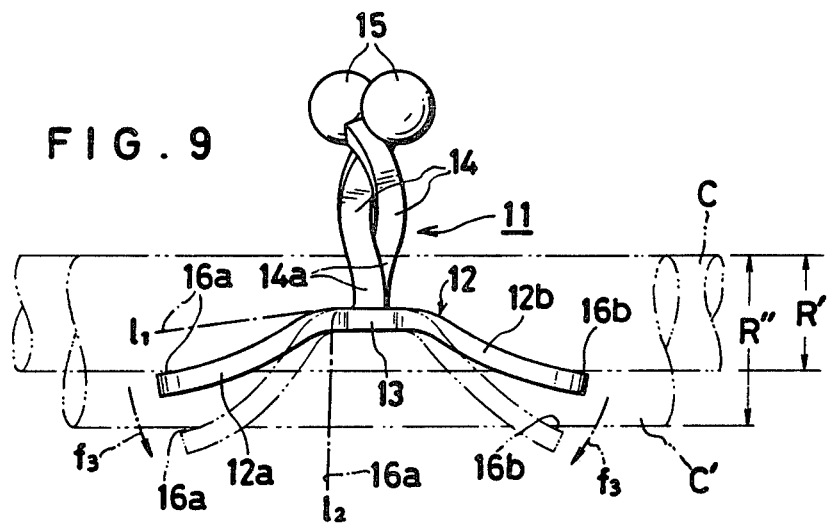
FIG. 9 is a side view of the binder at the final stage, showing the manner in which the binder can grip and hold bundles of different sizes.

The main advantage of a binder according to this invention is its capability of binding relatively small to large bundles of elongated bodies in a tight and stable way, as seen from FIG. 9.

The manner in which the binder can bind a relatively small bundle of elongated bodies (R' in diameter) is shown in solid lines, whereas the manner in which the binder can bind a relatively large bundle of elongated bodies (R" in diameter) is shown in phantom lines, the circular parts of the closed loop being bent greatly in the directions as indicated by arrows "$f_3$". The binding range of a binder according to this invention is very wide, compared with that of a conventional binder. Specifically, the size of the bundle which can be bound with a binder according to this invention varies from the vertical component of the slightly bent circular portion 16a (phantom line "$l_1$") to the vertical component of almost 90 degree-bent circular portion 16a (phantom line "$l_2$").

The intertwisted arms 14 should be upright at a similar angle with respect to each counter circular portion. Because, otherwise, the size of the bundle bound with a binder would be determined by one circular portion bent at a smaller angular distance from the intertwisted arms. On occasions a binder may be purposely set at such a slant posture, which allows a person to insert his fingers under the loosely binding circular portion around the bundle for the necessity of working. When necessary, a binder may be designed so as to have circular portions 12a and 12b of different sizes or shapes.

Figure 10:
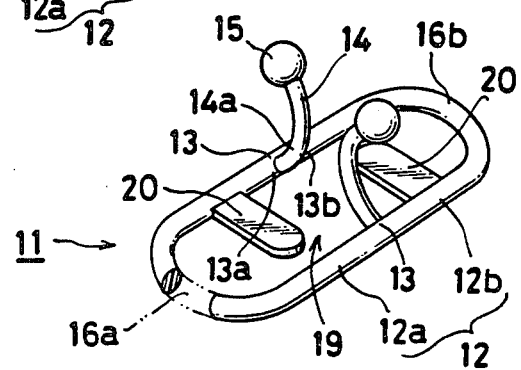
FIG. 10 is a perspective view of a binder according to a second embodiment of this invention.

FIG. 10 shows a modification of the binder.

The same elements as those in the first embodiment are indicated by the same reference numerals as used in FIGS. 2-9, and description thereof is ommitted in the following.

A closed loop 12 is elliptic in shape, and therefore the binder has two counter "U"-shaped portions in place of the semicircular portions of the first embodiment. A rectangular shape may be used in place of the eliptic shape. The eliptic loop of the second embodiment has a circular cross-section as indicated at 16a, different from the rectangular cross-section of the cocoon loop in the first embodiment. The arms 14 of the second embodiment preferably have a non-circular cross-section, as is the case with the first embodiment. This is because a non-circular cross-section is effective to increase resistance to untwisting of the intertwisted arms 14, preventing the binding strength from decaying with time.

In the second embodiment two resilient fins 20 extend inward from the elliptic loop in the form of a cantilever. These fins are of flexibility and stiffness appropriate for supporting a bundle of elongated bodies "C" in a stable condition.

The binding work and binding function of the second embodiment are the same as described in the first embodiment, and therefore further description is deemed unnecessary.

If there is no need for temporary holding, it is not necessary to give a diverging shape to the arms of the binder, which shape forms a throat 18 therebetween. It is, however, necessary to bend the arms in the opposite directions because otherwise, the intertwisting of the arms would be actually impossible.

Figure 11:
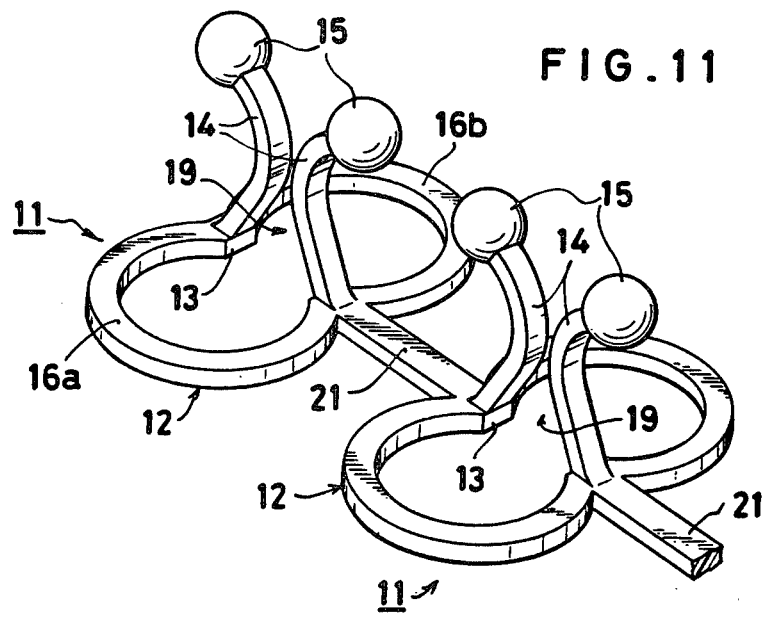
FIG. 11 is a perspective view of a binder according to a third embodiment of this invention.

FIG. 11 shows integrally connected twin binders 11. These binders are connected with a joint 21, which is integrally connected to the reentrant portions 13 of the binders 11. This twin type binder is used to hold two bundles of elongated bodies spaced a given distance from each other in a parallel relationship. The twin binders can be jointed at desired portions other than the reentrant portions of their loops. In place of parallel connection twin binders may be arranged angularly and connected to each other. A stepwise joint may be used to connect twin bindres at different staggered levels.

Figure 12:
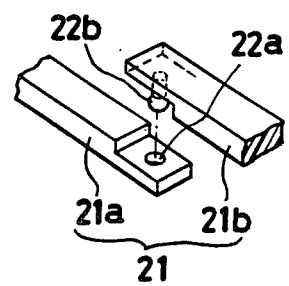
FIG. 12 is a perspective view of a modification of a joint detachably connecting two binders side by side.

As shown in FIG. 12, a joint may be composed of a pair of complementary parts 21a and 21b provided with a headed male post 22b and a female aperture 22a respectively, thereby permitting those parts to detachably connect to each other. As a matter of course, the twin binders may be separated, so that each one may be used as a single binder. A binder may be provided with male and female joint halves at its opposite sides, and then as many binders as required can be connected in series.

This particular embodiment is shown as comprising twin binders detachably connected with the aid of a snap-on joint. The binders, however, can be coupled with any appropriate joint selected from among those which are well known in the field of detachable joints, as for instance a toggle joint.

Figure 13:
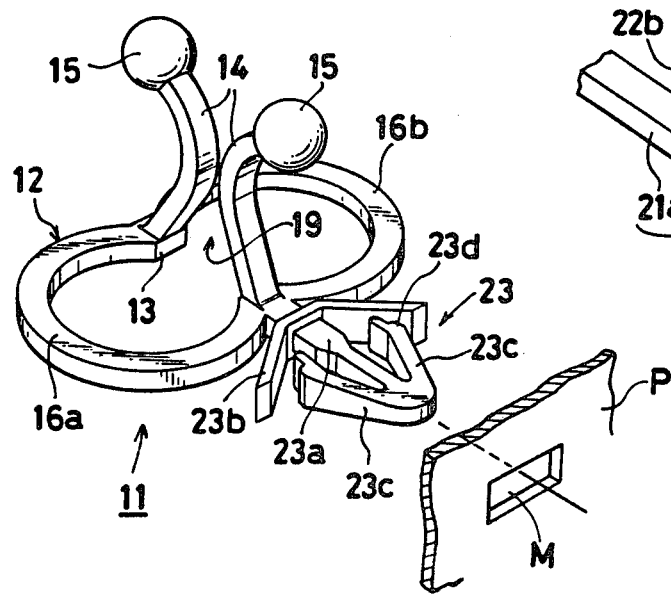
FIG. 13 is a perspective view of a binder according to a fourth embodiment of this invention.

FIG. 13 shows a binder equipped with an anchor 23, thereby enabling the binder 11 to attach itself to a panel "P".

Any anchor, no matter what shape and structure it may have, appropriate for the purpose can be used. For instance, in the simplest structure, a leg extending from one reentrant portion of the binder loop may be used. Then, the binder can be attached to the panel by fixing its leg to the panel with a screw. In this particular embodiment an anchor 23 is molded of plastic, and is designed to be pushed in and caught by an aperture "M" made in the panel "P".

Specifically, a stem 23a extends from one reentrant portion 13 of the binder loop, and the stem 23a has diverging resilient branches 23b at its root and converging resilient branches 23c at its top. The converging branches have detent surfaces 23d at their free ends.

When attaching the binder to a panel, its anchor is pushed in a fixing aperture "M" made in the panel "P". The converging branches 23c yieldingly shut and pass through the fixing aperture "M". When coming up at the back side of the panel, the converging branches return to their original shape, opening wide across the full width of the fixing aperture, thus catching the opposite sides of the fixing aperture with their detent surfaces 23d. On the other hand the diverging branches 23b are pushed against the front side of the panel to extend flat and wide beyond the fixing aperture of the panel. Thus, the anchor sandwiches the panel "P" betteen the diverging branches 23b and converging branches 23c of the anchor. The anchor 23 may be of any form appropriate for the purpose. The stableness with which a binder is attached to a panel will increase with the resilient force of the anchor. An anchor may be equipped with a sucker for the purpose of assuring water-tight attachment of the binder across a fixing aperture of a panel.

A twin binder (FIG. 11) may be combined with an anchored binder (FIG. 13), thereby enabling a train of binders to be attached to a panel.

As is apparent from the above, a plastic binder according to this invention can bind tightly a wide range of bundles sizes in a stable binding posture.

What is claimed is:

1. A binder for binding a bundle of elongated bodies comprising an elongated closed loop initially lying in a substantially common plane and a pair of converging-and-diverging arms integrally connected to and rising substantially perpendicular from opposite middle portions of said closed loop at its narrowest dimension, said bundle adapted to extend along the elongated axis of said closed loop and to initially fall generally in the same plane as said loop, twisting of said pair of arms into interlocking relationship causing the elongated ends of said loop to move out of said plane relative to said middle portions to accommodate said bundle diametrally within said closed interlocked arms.

2. A binder for binding a bundle of elongated bodies according to claim 1 wherein each of said arms has a spherical hook at its free end.

3. A binder for binding a bundle of elongated bodies according to claim 1 wherein said closed loop is composed of two open circles having an extent greater than 180° with their open ends abutting with each other and integrally connected to each other in the form of a cocoon.

4. A binder for binding a bundle of elongated bodies according to claim 1 wherein said closed loop is composed of two "U"-shaped portions with their open ends abutting with each other and integrally connected to each other in the form of an ellipse.

5. A binder for binding a bundle of elongated bodies according to claim 4 wherein said closed loop has two fins integrally connected and extending inward therefrom.

6. A binder for binding a bundle of elongated bodies according to claim 1 wherein said closed loop has a joint integrally connected to one or each side thereof, extending outward therefrom, thereby enabling the binder to connect to another binder side by side.

7. A binder for binding a bundle of elongated bodies according to claim 3 wherein said closed loop has a joint integrally connected to one or each side thereof and extending outward therefrom, thereby enabling the binder to connect to another binder side by side.

8. A binder for binding a bundle of elongated bodies according to claim 4 wherein said closed loop has a joint integrally connected to one or each side thereof and extending outward therefrom, thereby enabling the binder to connect to another binder side by side.

9. A binder for binding a bundle of elongated bodies according to claim 1 wherein said closed loop has an anchor integrally connected thereto, thereby enabling the binder to be attached to a panel.

10. A binder for binding a bundle of elongated bodies according to claim 3 wherein said closed loop has an anchor integrally connected thereto, thereby enabling the binder to be attached to a panel.

11. A binder for binding a bundle of elongated bodies according to claim 4 wherein said closed loop has an anchor integrally connected thereto, thereby enabling the binder to be attached to a panel.

* * * * *